United States Patent

Vidal et al.

[19]

[11] Patent Number: 6,059,225
[45] Date of Patent: May 9, 2000

[54] FLIGHT CONTROL DEVICE FOR AN AIRCRAFT, IN PARTICULAR A HELICOPTER

[75] Inventors: Pierre-Albert Vidal, Chateauneuf les Martigues; Eddy Gaston Jean Woirin, Velaux; Jean-Maxime Massimi, Vitrolles; Philippe Louis Ressent, Velaux, all of France

[73] Assignee: Eurocopter, Marignane Cedex, France

[21] Appl. No.: 09/056,301

[22] Filed: Apr. 6, 1998

[30] Foreign Application Priority Data

Apr. 7, 1997 [FR] France ................................ 97 04200

[51] Int. Cl.$^7$ .................................................... B64C 13/16
[52] U.S. Cl. ....................... 244/17.13; 244/194; 244/195; 244/76 R; 701/4
[58] Field of Search ............................... 244/184, 17.11, 244/17.13, 194, 195, 78, 76 R; 701/4, 5; 318/564; 714/797, 821, 820

[56] References Cited

U.S. PATENT DOCUMENTS

| 3,708,735 | 1/1973 | Barltrop ................................ 318/564 |
| 3,725,818 | 4/1973 | Nurmohamed et al. ............. 330/124 D |
| 3,805,235 | 4/1974 | Foster et al. ............................. 244/194 |
| 4,092,578 | 5/1978 | Fabian ....................................... 318/564 |
| 4,105,900 | 8/1978 | Martin et al. ............................ 244/194 |
| 4,132,378 | 1/1979 | Stevens ..................................... 244/175 |
| 4,327,437 | 4/1982 | Gelderloos .............................. 244/194 |
| 4,422,180 | 12/1983 | Wendt ..................................... 455/603 |
| 5,178,307 | 1/1993 | Wright et al. ......................... 244/17.13 |
| 5,274,554 | 12/1993 | Takats et al. .......................... 244/76 R |
| 5,550,731 | 8/1996 | Jackson ................................... 364/133 |
| 5,560,570 | 10/1996 | Pierson et al. ........................ 244/76 R |

OTHER PUBLICATIONS

French Search Report dated Dec. 23, 1997, 3 pages.

*Primary Examiner*—Galen L. Barefoot
*Attorney, Agent, or Firm*—Marshall, O'Toole, Gerstein, Murray & Borun

[57] ABSTRACT

A flight control device for an aircraft is provided with a control unit OP and a plurality of N instruction generating systems, each of which generates a first command instruction for the control unit OP and a least one of which performs autosurveillance and generates a corresponding surveillance signal. The flight control device is also provided with a plurality of P servocontrol systems, each of which is coupled to each of the instruction generating systems so that each of the servocontrol systems receives one of the first command instructions from each of the N instruction generating systems. Each of the servocontrol systems receives information identifying a particular position of a flight control unit, and each of the servocontrol systems communicates a second command instruction to the control unit OP based on the information.

14 Claims, 4 Drawing Sheets

FLIGHT CONTROL DEVICE FOR AN AIRCRAFT, IN PARTICULAR A HELICOPTER

BACKGROUND OF THE INVENTION

The present invention concerns a flight control device for an aircraft, in particular helicopter.

The flight control device of an aircraft captures command instructions generated by the pilot and transmits it to the aerodynamic control surfaces that cause a change in the spatial orientation of the craft. In first generation aircraft the flight control device was mechanical, pilot commands being generated by joysticks and rudder bars connected to the control surfaces by mechanical linkages based on links and/or cables. Second generation aircraft had a system for amplifying the force applied by the pilot integrated into the control surface, in the form of an actuator. The actuator was operated by the linkage and its movement was transmitted to the control surface. As safety requirements were strengthened, it was necessary to duplicate the linkages to survive a link or a cable breaking.

In today's third generation aircraft, to which the present invention applies, mechanical linkages are replaced with electrical wires that transmit the position of control devices actuated by the pilot to computers that transform them for execution by the actuators of the appropriate control surfaces.

The immediate benefit of a solution of this kind, representing an electric flight control device for aircraft in particular and more particularly for civil aircraft, is a significant saving in weight and the ease of increasing the number of command instruction routing paths. Safety is enhanced because a plurality of electrical paths in different locations in the craft are less vulnerable than one or two mechanical paths. The control computers also generate command instructions for stabilizing the aircraft and these are superposed on the command instructions from the pilot.

Although the saving in weight obtained by the use of an electrical flight control device is less on a helicopter than on a fixed wing aircraft, the benefit of a device of this kind on a helicopter is far from negligible, in particular because of the multiplicity of paths that are possible.

Nevertheless, when applied to a helicopter, a flight control device must offer particularly high performance, in particular ensuring safety with one control surface per axis and by being reconfigurable immediately in the event of a failure. In this respect fixed wing aircraft and helicopters differ in two important aspects:

firstly, a fixed wing aircraft includes a plurality of control surfaces that can cause it to react about the same axis. Accordingly, if the control path for one control surface fails, the path for command instructions to the other control surface can take over. In contrast, the helicopter has only one control surface per axis and the control of this control surface must assure safety on its own; and on the other hand, a fixed wing aircraft has some degree of inherent stability, allowing the control surface control system to be down for some time period during reconfiguration after a failure. In contrast, a helicopter is inherently unstable, which imposes continuous control at the risk of destabilizing it.

Some control modes are also very demanding in terms of computation capacity as they integrate, over and above command instructions from the pilot, input on the status of the helicopter, for example attitude or angular speed, in order to improve control performance, and in particular stability. The necessary computing power can then be provided only by digital computers. However, digital computers can fail for various reasons (hardware failure, software error, sensitivity to ionizing radiation).

One method of avoiding such failures is to use computers with different technologies for each path. In particular analogue technology is a good response to such problems. However, its use must be restricted because its low computing power can handle only relatively impoverished control modes and this is acceptable only if the probability of these occurring is low for mission reliability reasons.

SUMMARY OF THE INVENTION

An aim of the present invention is to remedy these drawbacks. The invention concerns a flight control device for an aircraft, in particular a helicopter, of simple low-cost implementation and meeting the requirements previously stated, in particular those concerning reliability.

To this end, in accordance with the invention, said flight control device for an aircraft, of the type receiving a plurality of information, and in particular the positions of flight control units of said aircraft and transmitting commands to control units of the aircraft in accordance with such information is noteworthy in that it includes:

a plurality of n instruction generating systems each of which generates a set of first command instructions for said control units and at least one of which performs autosurveillance and generates corresponding surveillance signals; and a plurality of p servocontrol systems each of which:
  receives the information generated by each of said n instruction generating systems, i.e. the first instructions and where applicable the surveillance signals;
  selects the information sent by one of said instruction generating systems; and
  determines second instructions from the information selected in this way,
the second instructions determined by at least some of the p servocontrol systems being communicated to the control units of the aircraft as command instructions.

Accordingly, by virtue of the invention, and in particular by virtue of the n-fold redundancy in the generation of instructions and the p-fold redundancy in processing, the values of n and p preferably being in the range 3 to 6, a particularly reliable device is obtained that is resistant to failures in all possible mission conditions.

The means employed to this end are technological, architectural, methodological and algorithmic, as will emerge in more detail below, and this achieves the required safety enhancement.

Moreover, said device is simple to implement at relatively low cost.

Each servocontrol system preferably selects information in a predefined order of relative priority of the instruction generating systems, taking account of the surveillance signals generated where necessary. Moreover, said servocontrol systems operate in parallel and the instructions issued by said systems are additive.

Each of said instruction generating systems capable of performing autosurveillance advantageously further includes two separate processing channels, autosurveillance being performed by comparing the results obtained by each of said processing channels.

To further enhance the reliability and the safety of processing, in one particularly advantageous embodiment at least one of said servocontrol systems performs autosurveillance.

Moreover, in accordance with the invention, the instruction generating systems and the servocontrol systems can be:
- of the analogue type; or
- of the digital type; or
- partly of the analogue type and partly of the digital type.

Note that this latter solution is particularly advantageous, in particular in some extreme situations. If all the computing means of one of said types fail, for example all the digital computation means following a general software failure of said digital means, the device of the invention can continue to operate using the computation means of the other type, that is to say the analogue means in this case.

Further, in accordance with the invention, the transmission of information between an instruction generating system and a servocontrol system can be in the analogue domain using electrical connections or in the digital domain using electrical or optical connections (the latter based on optical fibers).

Moreover, in one particularly advantageous embodiment, at least one of said instruction generating systems includes k partial systems and at least one voter associated with said partial systems and determines the information to be transmitted to the servocontrol systems on the basis of information generated by said partial systems.

In this case the number k of partial systems is preferably equal to the number p of servocontrol systems and each of said partial systems includes a voter, said voters being connected to respective servocontrol systems.

The figures of the appended drawings show clearly how the invention can be put into effect. In the figures the same reference numbers designate similar items.

DETAILED DESCRIPTION OF THE PREFERRED EMBODIMENTS

FIGS. 1 to 4 are diagrams representing four different embodiments of a flight control device DCV based on the same general principle.

Said control device DCV (which is preferably electrical) applies more particularly, but not exclusively, to a helicopter, not shown. In a helicopter pitch and roll control and vertical control are effected by means of three actuators controlling the position of a fixed plate the position of which is transmitted to a plate rotating with the rotor, thereby communicating a variation in the pitch of each blade through the intermediary of links. Each actuator therefore contributes to control of each of the three axes. Yaw control is assured by a single actuator controlling the pitch of the tail rotor blades identically. Loss of control of any of these four actuators must therefore be avoided at all costs.

The aim of the invention is to process electrically and to manage command instructions from the pilot or pilots applied in particular to the joystick and the rudder bar, allowing for gyro, accelerometer and/or attitude measurements, to generate in a safe and reliable manner command instructions communicated to control units OP of the aircraft. To be more precise, command instructions are transmitted to servocontrol units of the control surfaces of the aircraft or to the drive motors of such servocontrol units.

Figure 1:
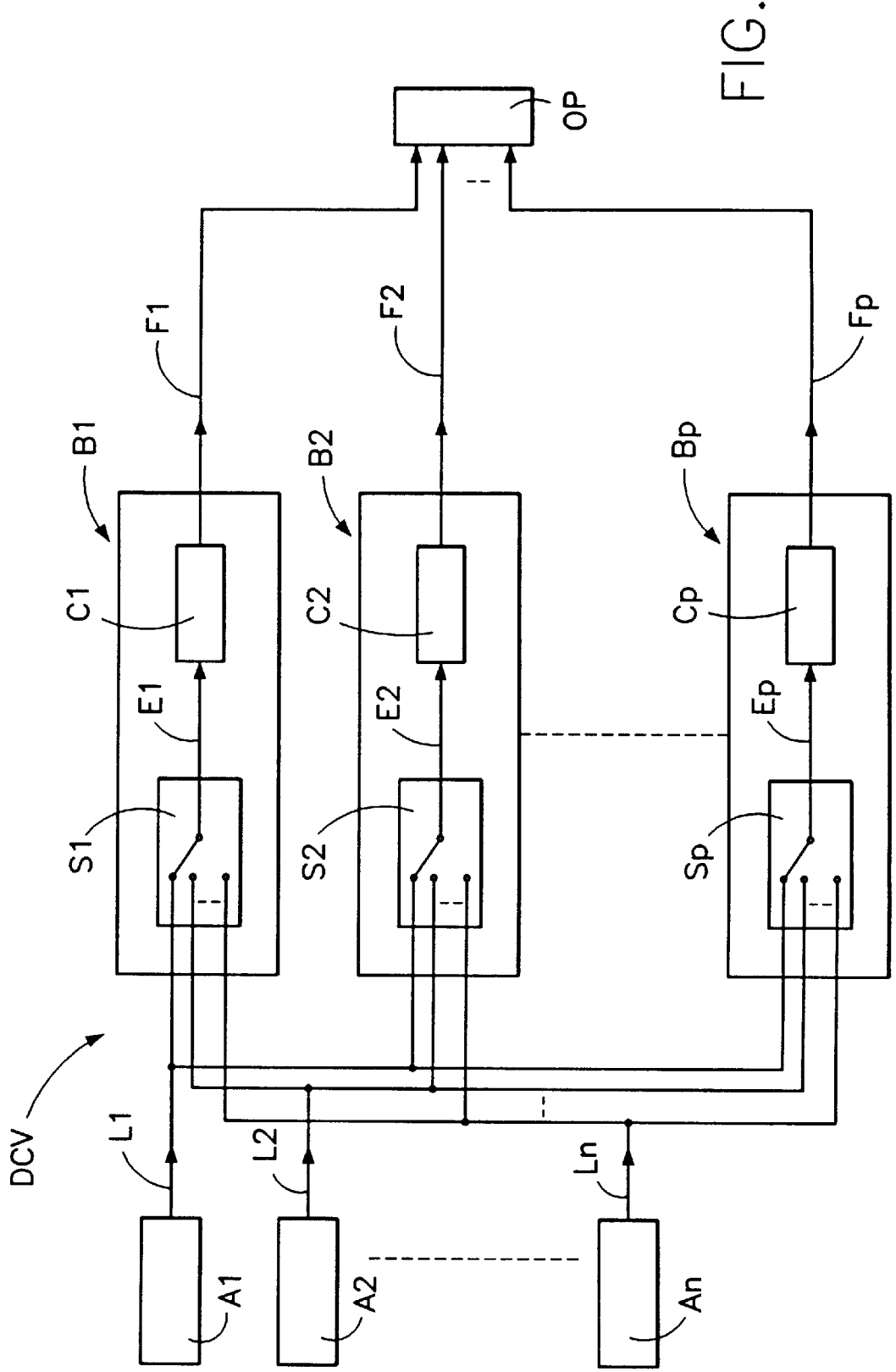
FIGS. 1 through 4 are block diagrams of flight control devices constituting four different embodiments of the invention.

To this end said flight control device DCV includes, in accordance with the invention, and as shown in FIG. 1, for example:

- a plurality of n systems A1 through An for generating either servocontrol unit position command instructions or axis command instructions. Each of said n systems A1 through An, n preferably being in the range 3 to 6, therefore generates a set of first command instructions for said control units OP and therefore corresponding to the various axes or the various servocontrol units. Furthermore, at least some of said systems A1 through An perform autosurveillance and to this end generate surveillance signals, i.e. validity signals and/or consistency check signals; and
- a plurality of p servocontrol systems B1 through Bp operating in parallel, p preferably being also in the range 3 to 6. Said servocontrol systems B1 through Bp receive the first instructions and where applicable the surveillance signals generated by the systems A1 through An via links L1 through Ln, determine second instructions and transmit them to the control units OP via links F1 through Fp.

As shown in FIG. 1, each of said links L1 through Ln is connected to each of said servocontrol systems B1 through Bp. The links can be electrical links or optical links (i.e. optical fibers in the latter case) and the information transmitted can be analogue or digital.

In accordance with the invention each of said servocontrol systems B1 through Bp includes:

- selector means S1 through Sp connected to all said links L1 through Ln and which select the information (first instructions and where applicable surveillance signals) communicated by one of said systems A1 through An and transmit it to respective computation means C1 through Cp via a respective link E1 through Ep. The selection is based on a predefined order of relative priority of the instruction generating systems A1 through An, taking account of the surveillance signals generated where necessary; and
- said computation means C1 through Cp which determine from the first instructions transmitted by the selector means S1 through Sp second instructions that it transmits via a respective link F1 through Fp to the control units OP of the aircraft.

In one particularly advantageous embodiment at least one of said servocontrol systems B1 through Bp performs autosurveillance.

Furthermore, in accordance with the invention, the flight control device DCV is based on the following principles:

- the design of at least the first instruction generating system, in selection priority order, being such that it is extremely improbable that erroneous first instructions will be produced associated with a validity signal in the valid state, and where applicable with a consistency check signal in the consistent state; and/or
- the facility for partial or total dissymmetry of design, implementation or technology that can be introduced between the n instruction generating systems A1 through An and between the p servocontrol systems B1 through Bp because of the architecture employed.

It is preferable if all the instruction generating systems perform autosurveillance.

Accordingly, in accordance with the invention, a reconfiguration management scheme is obtained based on:

- autosurveillance of each system A1 through An transmitted to the selector means S1 through Sp by means of the surveillance signals;
- the logic implemented in the systems A1 through An when the latter are of the digital type; and the aforementioned selection process implemented by the selector means S1 through Sp.

This reconfiguration management scheme and the associated logic enable selection of the instructions generating system having the highest level of functionality. For example in the case of digital systems, subject to degradation that does not compromise safety but affects one of said digital systems, each of the digital systems sets its validity as a simultaneous function of:

its number in the priority list; and its respective degradation relative to the degradation of the other systems, in an ordered relationship corresponding to a predefined list of degradations.

Accordingly, for example in the case of two digital systems, the loss of certain functions of the highest priority digital instruction generating system, with the other system in a nominal state, leads to temporary invalidation of said highest priority instruction generating system. In the event of a failure invalidating the second digital system, said first system resets its validity to the valid state and is again selected.

Figure 2:
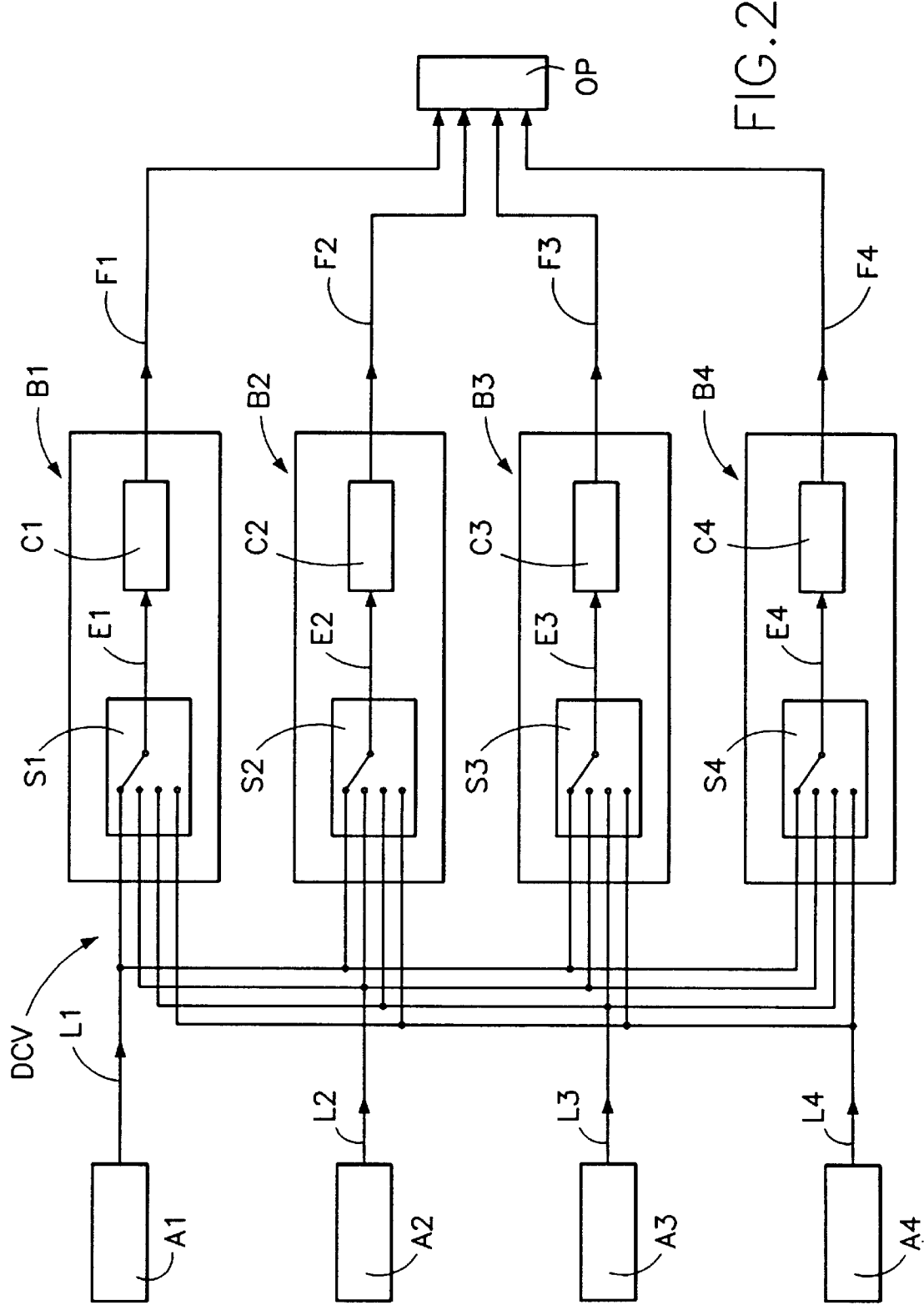

In the second embodiment shown in FIG. 2 the flight control device DCV applied to a helicopter includes four instruction generating systems A1 through A4 and four servocontrol systems B1 through B4.

In this case each of said systems A1 through A4 is a dual system. In the context of the present invention a dual system is a system comprising devices performing surveillance of the instructions generated by a redundant processing channel and in the event of a mismatch between the processing channels internal to said system setting one or more validity signals accordingly.

The duality of said systems A1 through A4 is such in this case as to guarantee autosurveillance with an extremely low probability of sending an erroneous instruction, without loss of validity, or of loss of consistency of consistent control signals.

Moreover, each of said systems A1 through A4 generates first instructions corresponding to instructions for commanding each of the four servocontrol units of the helicopter. In this case, each of said servocontrol units is commanded by four motors fed with respective second instructions generated by the four systems B1 through B4 and the forces exerted by which are summed to impose their positions and directly on said servocontrol units by mechanical means.

In the FIG. 2 embodiment the systems A1 and A2 are digital systems and the systems A3 and A4 are analogue systems.

Each of the digital systems A1 and A2 executes sophisticated control laws. To this end it includes two processing channels:

one of which generates said first instructions, that is to say the command instructions relating to the servocontrol units; and the other of which generates a consistency signal enabling the servocontrol systems to verify consistency with the first instructions generated by the aforementioned first processing channel.

Moreover, each of said systems A1 and A2 sends two validity signals. Each processing channel performs the processing on processors synchronized by a common real time clock and is associated with dedicated joystick sensors that it feeds directly.

Moreover, in addition to processing control input, the analogue systems A3 and A4 assist stabilization about the pitch and roll axes. Each of the systems A3 and A4 also includes two processing channels that generate signals of the same type as the digital systems A1 and A2. Each processing channel is associated with dedicated joystick sensors (potentiometer type) that it feeds directly and additionally includes a gyro sensor on the pitch axis and on the roll axis. Additionally, the two analogue systems A3 and A4 are designed to be resistant to ionizing radiation.

In nominal operation the systems B1 and B4 give priority to selecting the instruction generating system A1, then the system A2 should the first fail, then the system A3 should the first two fail, and finally the system A4 should the first three fail.

Consequently, the aforementioned architecture can survive a combination of failures affecting up to three of the systems A1 through A4.

Moreover, the aforementioned architecture that features total dissymmetry between the digital instruction generating systems A1 and A2 and the analogue instruction generating systems A3 and A4 can survive common failure modes, for example of the digital systems A1 and A2, in particular software failure modes.

If the two digital systems A1 and A2 both become invalid because of the consecutive loss of the two systems A1 and A2 or because of a common mode failure, for example a software failure, the highest priority analogue instruction generating system is selected.

Moreover, during momentary loss of digital instruction generation capability during re-establishing of the validity of one of said digital systems the latter is again selected after confirmation by the servocontrol systems B1 through B4.

Moreover, the servocontrol systems B1 through B4 are of the dual type in order to be able to detect a failure. They use analogue technology. The design of these systems B1 through B4 is such that:

in the absence of any failure, second instructions corresponding to average values of said systems are generated;

in the event of a failure detected by a system, it is eliminated; and in the event of a failure that is not autodetected, the systems where there is no failure take over from the system affected by the failure.

Consequently, the above architecture can survive three detected failures of the servocontrol systems or the combination of one non-autodetected failure of these systems with one detected failure of these systems.

Note that in the context of the present invention the implementation of the flight control device DCV can generally vary in terms of:

the nature of the protocol between the instruction generating systems A1 through An and the servocontrol systems B1 through Bp;

the degree of dissymmetry between the instruction generating systems A1 through An;

the possible use of at least one instruction generating system without autosurveillance or with a low level of autosurveillance; a system without autosurveillance is a simplex type system, considered to be systematically valid and used only in the event of failure of the preceding systems; and the use of servocontrol systems B1 through Bp with no autosurveillance; this is possible if the number P is sufficiently high; however, the device DCV is then able to support only a number less than p/2 of failures affecting the servocontrol systems B1 through Bp.

Figure 3:
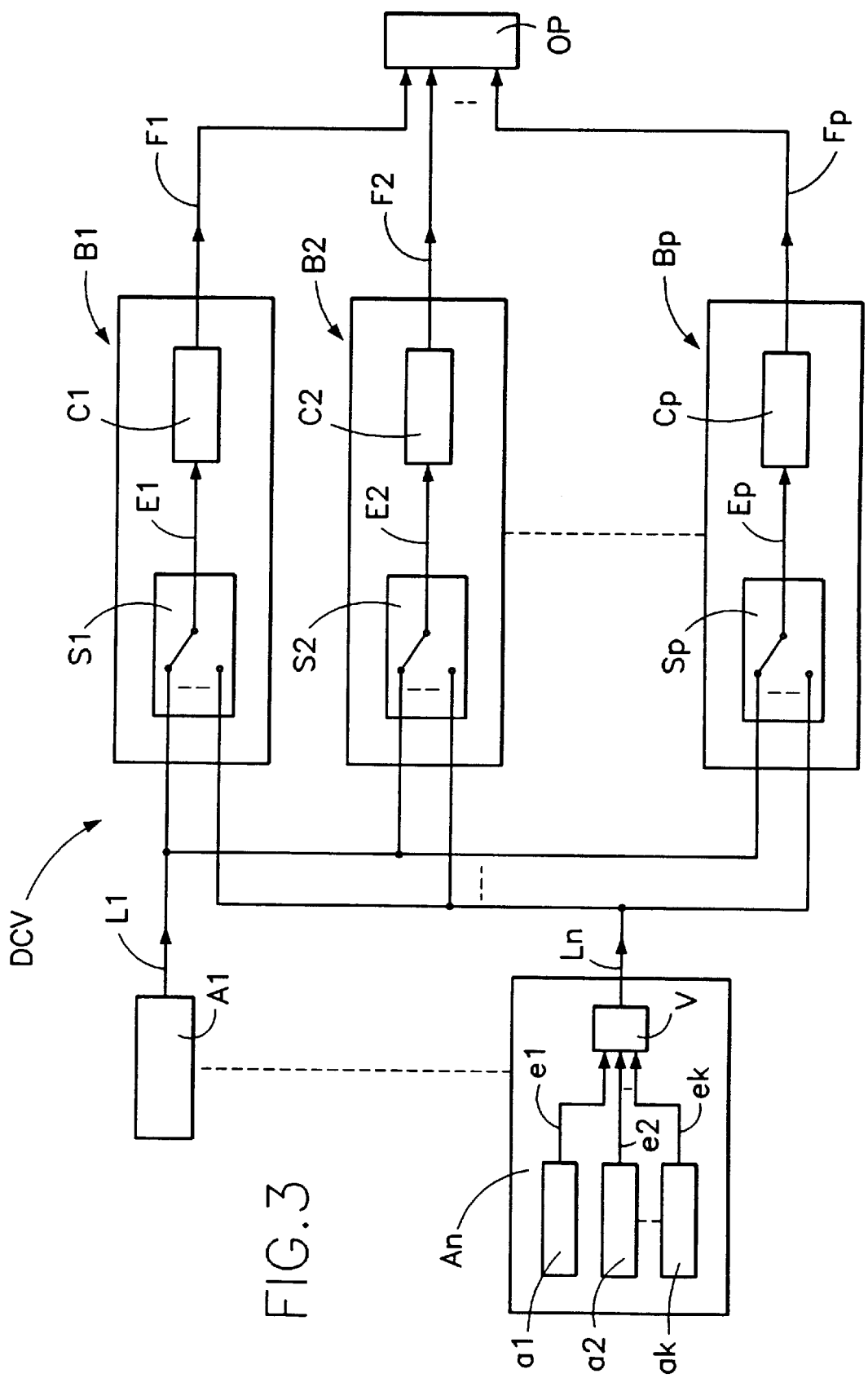
Figure 4:
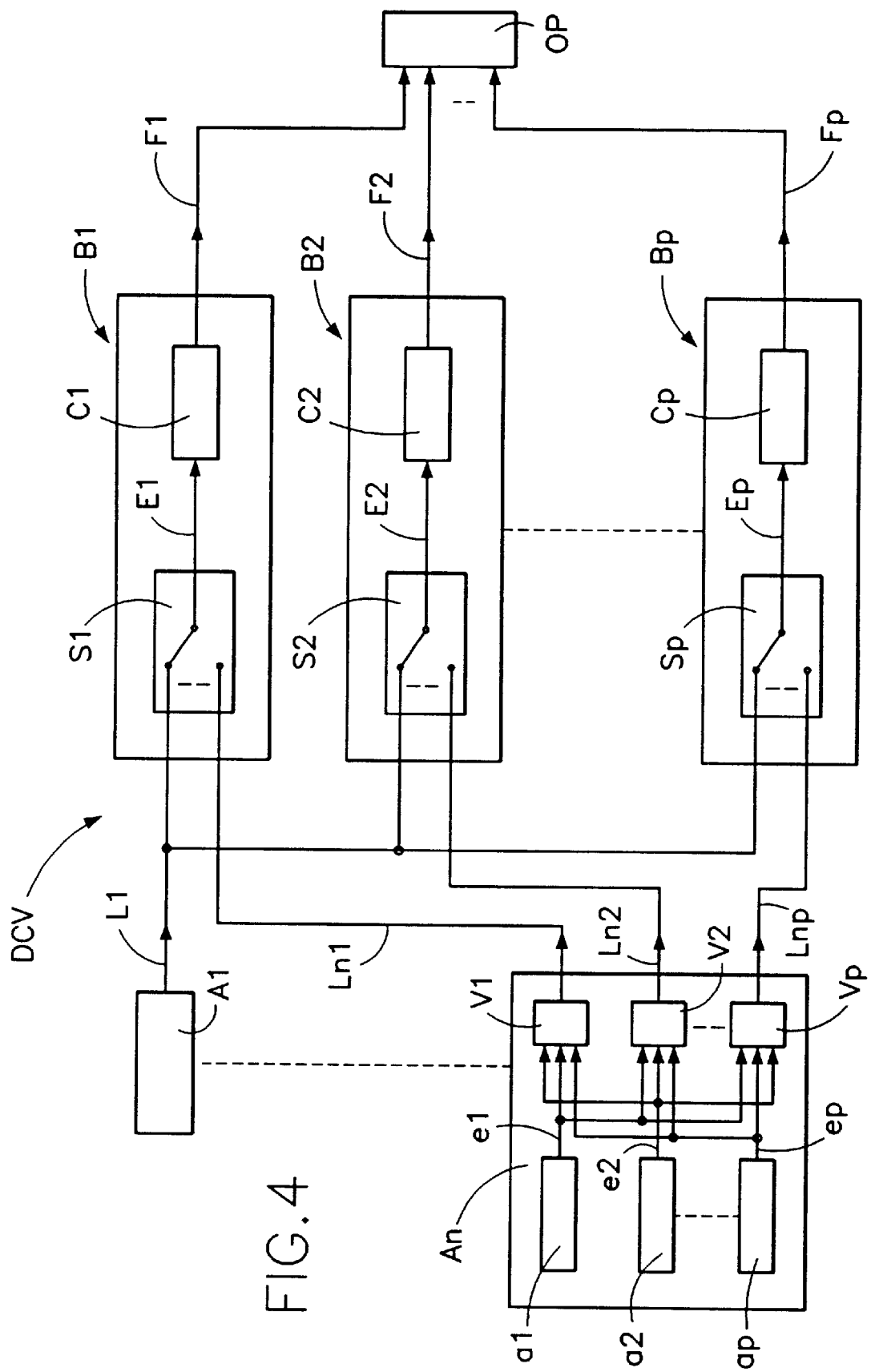

In another variant at least one An of the systems A1 through An includes partial systems a1 through ak operating in parallel, as shown in FIGS. 3 and 4.

In the embodiment shown in FIG. 3 said system An further includes said k partial systems a1 through ak and a voter V connected to said partial systems a1 through ak respectively by links e1 through ek.

Said voter V determines from the information received from said partial systems a1 through ak the information to be transmitted to the systems B1 through Bp over the link Ln, in accordance with the following principle:

- if the input values of the voter V have the same value to within a particular threshold the output value of said voter V is a linear combination of said input values; and
- if an input value departs from a value that is higher than the average of the input values to within a threshold it is eliminated.

In the particular embodiment shown in FIG. 4 the system An includes p partial systems a1 through ap operating in parallel and each of said partial systems a1 through ap includes a voter V1 through Vp, said voters V1 through Vp being connected to said servocontrol systems B1 through Bp respectively via links Ln1 through Lnp.

What is claimed is:

1. A flight control device for an aircraft, comprising:
    a control unit OP;
    a plurality of N instruction generating systems, each of said instruction generating systems generating a first command instruction for said control unit OP and a least one of said instruction generating systems performing autosurveillance and generating a corresponding surveillance signal, each of said instruction generating systems being assigned a relative priority; and
    a plurality of P servocontrol systems, each of said servocontrol systems being coupled to each of said instruction generating systems so that each of said servocontrol systems receives one of said first command instructions from each of said instruction generating systems, each of said servocontrol systems receiving information identifying a particular position of a flight control unit and each of said servocontrol systems communicating a second command instruction to said control unit OP based on said information, each of said servo control systems comprising:
    selector means that receives one of said first command instructions from each of said instruction generating systems, said selector means selecting one of said first command instructions in accordance with said relative priority of said instruction generating systems; and
    computing means coupled to said selector means, said computing means generating one of said second command instructions based on said first command instructions selected by said selector means and said surveillance signal.

2. The device as defined in claim 1 wherein said servocontrol systems operate in parallel and wherein said first command instructions from said instruction generating systems are summed.

3. The device as defined in claim 1 wherein each of said instruction generating systems that is adapted to perform autosurveillance includes two separate processing channels and wherein said autosurveillance is effected by comparison of the results obtained for each of said processing channels.

4. The device as defined in claim 1 wherein at least one of said servocontrol systems performs autosurveillance and automatic disabling of a system detected to have failed.

5. The device as defined in claim 1 wherein at least one of said instruction generating systems comprises a digital system.

6. The device as defined in claim 1 wherein at least one of said instruction generating systems comprises an analog system.

7. The device as defined in claim 1 wherein at least one of said servocontrol systems comprises an analog system.

8. The device as defined in claim 1 wherein at least one of said servocontrol systems comprises a digital system.

9. The device as defined in claim 1 wherein at least some information transmitted between said instruction generating systems and said servocontrol systems is transmitted by electrical links.

10. The device as defined in claim 1 wherein at least some information transmitted between said instruction generating systems and said servocontrol systems is transmitted by optical links.

11. The device as defined in claim 1 wherein said device comprises between three and six information generating systems and between three and six servocontrol systems.

12. The device as defined in claim 1 wherein at least one of said instruction generating systems includes K partial systems and at least one voter which is associated with said partial systems and which determines on the basis of information generated by said partial systems which information is to be transmitted to said servocontrol systems.

13. The device as defined in claim 12 wherein said number K of partial systems is equal to said number P of servocontrol systems and wherein each of said partial systems includes a voter, said voters being connected to respective servocontrol systems.

14. A device as defined in claim 1 wherein said flight control device is adapted to be incorporated in a helicopter.

* * * * *